United States Patent

Gerstle

[15] 3,643,322
[45] Feb. 22, 1972

[54] METHOD FOR MANUFACTURING A SHOCK ABSORBER RESERVOIR TUBE

[72] Inventor: De Witt F. Gerstle, Dayton, Ohio
[73] Assignee: General Motors Corporation, Detroit, Mich.
[22] Filed: June 29, 1970
[21] Appl. No.: 50,529

[52] U.S. Cl. ............................29/482, 29/475, 72/352, 72/367, 285/286
[51] Int. Cl. ..........................B23k 1/20, B23k 31/02
[58] Field of Search ...............29/475, 482, 470; 285/286; 287/56, 20.2; 72/343, 352, 367

[56] References Cited

UNITED STATES PATENTS 2,779,998   2/1957   Bailey ..............................29/475 X
3,251,122   5/1966   Boteler ............................29/475 X Primary Examiner—John F. Campbell
Assistant Examiner—Richard Bernard Lazarus
Attorney—W. S. Pettigrew and J. C. Evans

[57] ABSTRACT

In preferred form, a method of manufacturing a shock absorber tube from sheet metal comprising the steps of forming a tube section having a longitudinal seam weld along the length thereof; forming a concave die having an inside surface with a central opening therein and a plurality of radial grooves extending from the central opening to the outer peripheral edge of the concave surface; pressing the tube into the die and causing the metal at one end of the tube to form into the inside surface of the concave die to cover ribs between the grooves and to flow into the grooves so as to form spaced, inwardly and outwardly directed reinforcing ribs and a small diameter tapered opening through the formed tube surrounded by a high-density concentration of material; thereafter locating a connector element against the high-density concentration of material and heating and pressing the metal to cause it to flow into the tapered opening for sealing the end of the tube while sinking the connector into the end of the tube for connection to the spaced reinforcing ribs.

4 Claims, 14 Drawing Figures

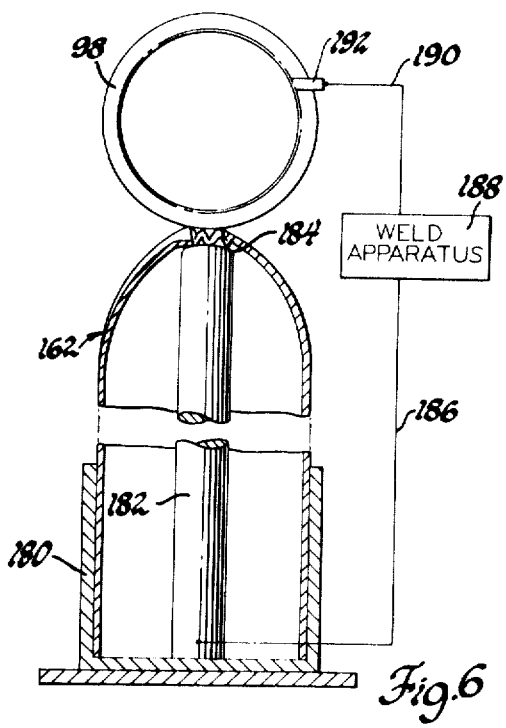
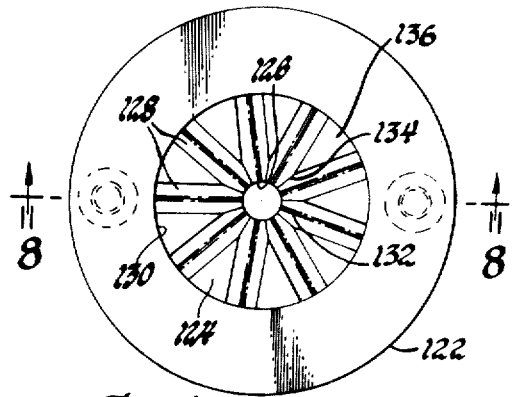
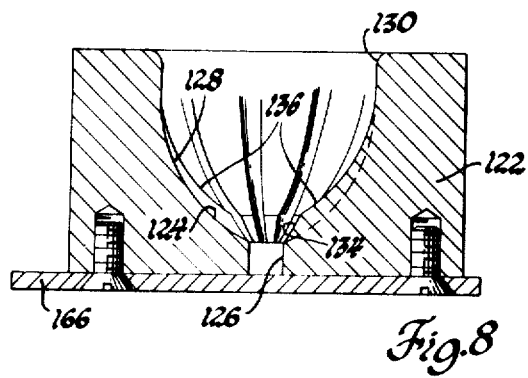
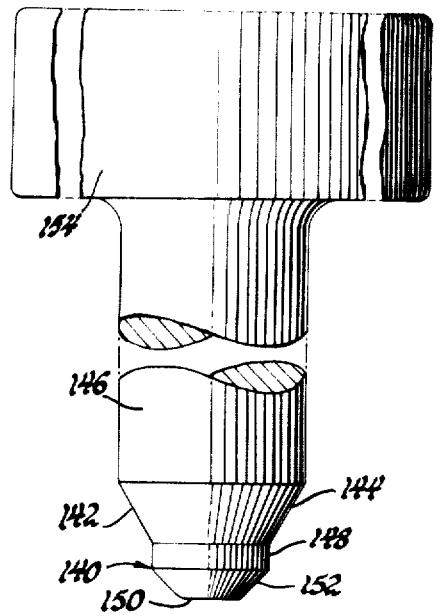
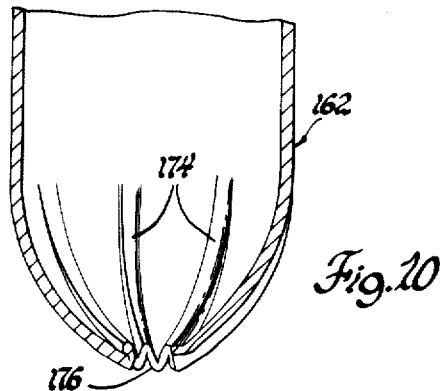
INVENTOR.
DeWitt F. Gerstle
BY
J. C. Evans
ATTORNEY INVENTOR.
DeWitt F. Gerstle
BY
J. C. Evans
ATTORNEY

METHOD FOR MANUFACTURING A SHOCK ABSORBER RESERVOIR TUBE

This invention relates to shock absorbers for automobiles and more particularly to an improved method for forming an integral cup on one end of steel tubing that defines the reservoir tube of a double direct acting hydraulic chock absorber.

In many present day shock absorber reservoir tubes made of sheet metal there is a separate base cup on the bottom end of the reservoir tube that is connected to the reservoir tube by a continuous circumferential weld joint.

Such separate cups require a male and female die combination to define a plurality of separate raised surfaces within the cup for supporting a base valve assembly used in shock absorbers having such reservoirs.

In order to have adequate strength the separate base cup of such units is made from a relatively heavy gauge material. Furthermore, it requires a separate joining operation to sealingly connect the reservoir tube to the periphery of the cup.

An object of the present invention is to simplify the manufacture of a shock absorber reservoir tube with an integral end cup by a method that forms it from a single metal blank by use of a single female die including a concave surface configuration thereon for forming an opened end of a sheet metal tube radially inwardly and on itself to form a small diameter tapered opening at the end of the tube surrounded by a high concentration of sheet metal material defining a plurality of easily heated sharp edges; and thereafter locating a connector element on the outer surface of the tube at the tapered opening therethrough and applying a resistance welding current across the tube and the connector element to heat the high concentration of metal to cause it to flow into the tapered opening for filling the tapered opening with a melted metal plug; and simultaneously pressing the connector element into the end of the tube so as to securely connect it in place thereon.

Still another object of the present invention is to provide an improved method for forming a shock absorber reservoir tube with an integral end cup form sheet material comprising the steps of: rolling a strip of steel into a tube having a pair of longitudinal edge portions thereon, seam welding the longitudinal edges together to form a sealed joint along the length of the tube, locating the seam welded tube in axial alignment with a concave die surface having a central opening therein and a plurality of radial grooves extending from the opening to the peripheral edge of the concave surface at equidistantly spaced circumferential locations and wherein each of the grooves is separated by a raised rib; pressing one end of the tube into the concave surface to cause the tube to be forced radially inwardly of itself into a cup shape by metal forming across the ribs and into the grooves to form reinforcing ribs and to be pressed in the direction of the opening through the die into a tapered opening defined by a plurality of circumferential metal folds or crimped material forming high density concentration of metal completely around the tapered opening; thereafter coining the end of the tube to form a controlled diameter opening to the inside of the tube; locating a connector element on the outside surface of the tube at the tapered opening therein and applying heat and pressure so as to cause the high density metal to melt into the tapered opening for filling to seal the inside of the tube while simultaneously causing the connector element to sink into the ribs on the end of the tube for securing it thereto.

These and other objects of the present invention are attained in one working embodiment by a method that includes rolling a blank of sheet material into a tube having a controlled oval form and seam welding the longitudinal edges along the tube to form one side thereof; thereafter pressing one open end of the tube into a mechanical die of a concave configuration and a particular form that will cause the open end of the tube to close on itself into a shape which includes a high density plurality of metal folds defining a tapered small diameter opening in the tube from which a plurality of inwardly and outwardly directed ribs extend to merge into an undeformed portion of the outer surface of the tube. The inwardly and outwardly directed ribs serve to reinforce the end of the tube and to define a plurality of spaced apart ledges for supporting a base valve assembly in the shock absorber.

The tapered opening in the tube is closed by heating and pressing metal around the tapered opening into the opening to close it completely against leakage and depressing the connector element simultaneously into the ends of the ribs around the opening therein for connection thereto by means of the melted metal portions of the folds.

The method contemplates a step during the deforming of the open ends of the tube wherein the seam weld is located on a part of the concave die at which there is a minimum amount of metal deformation during the formation of an integral cup on the end of the tube.

Furthermore, the method contemplates a coining operation following formation of the tapered opening in the tube wherein the tapered opening through the folded metal at the end of the tube is deformed to produce a controlled diameter opening into the tube not to exceed a predetermined maximum diameter for receiving the melted metal flow during the sealing operation.

Further objects and advantages of the present invention will be apparent from the following description, reference being had to the accompanying drawings wherein a preferred embodiment of the present invention is clearly shown.

In the drawings:

FIG. 6 is a diagrammatic view showing welding electrodes electrically connected to welding apparatus together with means for pressing a connector into the tube for sealing the tube while securing the connector to the tube;

FIG. 7 is a top elevational view of the die used in the process;

FIG. 8 is a vertical sectional view taken along line 8—8 of FIG. 7 looking in the direction of the arrows;

FIG. 9 is a side elevational view of the end of a punch used in the coining operation;

FIG. 10 is an enlarged fragmentary sectional view of the end of the tube following metal forming steps;

FIG. 11 is a view partly in elevation and partly in vertical section of a shock absorber having a reservoir tube made in accordance with the present invention;

FIG. 12 is a view in vertical section of the tube and connector prior to weld;

FIG. 13 is a view in horizontal section taken along the line 13—13 of FIG. 11; and FIG. 14 is a horizontal sectional view taken along the line 14—14 of FIG. 11 looking in the direction of the arrows.

Figure 1:
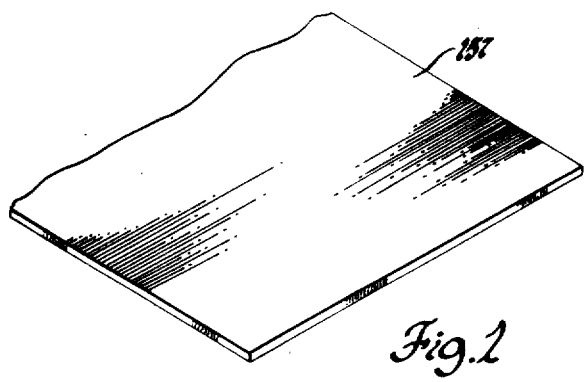
FIG. 1 is a view of a sheet metal strip used in the present invention.

Referring now to the drawings, in FIG. 11 a hydraulic shock absorber 20 is illustrated having a pressure cylinder 22 closed at the base thereof by a base valve assembly 24 and at the top end thereof by a rod guide 26.

The base valve assembly 24 more particularly includes an orificed valving element 28 with a peripheral flange 30 seated on an annular valve seat 32 around a central opening 34 through the base valve assembly 24 which communicates the interior of the pressure cylinder 22 with a reservoir space 36 formed between the pressure cylinder 22 and a reservoir tube 38.

More particularly, the valving element 28 is held against the seat 32 by a light spring element 40 that regulates the flow from the reservoir 36 into the pressure tube 22 during a rebound stroke of the shock absorber.

During a compression stroke the valving element 28 is maintained against the seat 32 and flow control is obtained across a fixed orifice 42 through the valving element 28.

The reservoir tube 38 is closed at the top by an inverted cup member 44 which has an end opening 46 therein through which extends a piston rod 48.

The piston rod 48 is connected to the upper end thereof to a closure member 50 connected to the top of a tubular dust shield element 52 located in surrounding telescoping relationship with the outer surface of the reservoir tube 38.

The inverted cup element 44 defines the top of a rod seal assembly 52 which includes an annular resilient multilipped resilient seal member 54 having its upper end in engagement with the under surface of the cup element 44 and the under surface thereof supported by a washer 56 that is engaged by the upper end of a spring element 58 having its opposite end supportingly received within an annular groove 60 in the upper surface of the rod guide 26.

The rod guide further includes a tubular bearing segment 62 thereon that guides the piston rod 48 in axial alignment with the pressure cylinder 22 during reciprocation of the rod into and out of the cylinder 22.

Damping during rebound and compression strokes of the shock absorber also is under the control of a piston assembly 64 that includes a base member 66 connected to a small diameter end 68 on the rod 48.

In this arrangement the base 66 defines a top of a control chamber 70 which communicates with a rod flow passageway 72 arranged on the axis of rod 48. It has a side outlet port 74 into a rebound chamber 76 of the pressure cylinder 22.

The rebound chamber 76 is separated from a compression chamber 78 by an annular sealing element 80 on the outside surface of the base member 66 which is supported in sliding sealing engagement with the inner surface of the tube 22.

The base includes an inwardly turned flange 82 thereon which supportingly receives the peripheral flange of a perforated sheet metal valve cage 84 which depends downwardly from the piston assembly 64 and has a generally truncated conical configuration.

It supports a rebound valve spring 86 that maintains a rebound valving element 88 against a valve plate 90 within the control chamber 70.

The upper surface of plate 90 supportingly receives a rebound valve element 92 held in place by a spring 94.

The details of the valve assembly 64 form no part of the present invention and are merely representative of a construction found in double direct acting hydraulic shock absorbers and operative to maintain distinct damping characteristics in response to road conditions that cause the piston rod 48 to move into and out of the hydraulic fluid filled pressure cylinder 22.

In shock absorbers of this type there is a predetermined level of hydraulic fluid within the reservoir 36 which flows into and out of the pressure cylinder 22 to accommodate changes in the volume within cylinder 22 occupied by the piston rod 48 during its relative reciprocation into and out of cylinder 22. A groove 95 in tube 38 forms a baffle within the reservoir space 36 to reduce aeration of hydraulic fluid therein.

The upper end of the piston rod 48 is connected to a bearing ring 96 which serves as a means for connecting the upper end of the shock absorber 20 to the sprung mass of a vehicle.

The opposite end of the shock absorber 20 has an improved lightweight, high strength configuration that is formed in accordance with certain principles of the present invention.

More particularly, the bottom end of the reservoir tube 38 is cup formed as an integral part of the tube and is connected to a bottom bearing ring 98 by a method which results in a sealed high strength end configuration suitable for heavy duty use.

It includes a longitudinal seam weld 99 therealong which results in a reservoir tube 38 of a unitary form with an integral cup end which eliminates the need for a separate cylinder base cup and a welded joint between such a base cup and the reservoir tube as found in many present day shock absorbers.

In addition to eliminating a part and a sealed joint, the improved reservoir tube 38 includes advantageous structural features that reinforce the shock absorber 20 in the vicinity of the base bearing ring 98. These features also locate and support the base valve assembly 24 interiorly of the tube 38 to accommodate for unrestricted flow of fluid between reservoir 36 and the interior of the tube 22.

More particularly, the tube 38 at the bottom end thereof includes a plurality of equally circumferentially spaced flutes 100 therein.

Each of the flutes 100 include a distinct configuration that serves to define a reference support for the internal operative components of the shock absorber 20 as well as to reinforce the lower end of the shock absorber unit 20 against high concentrations of stress directed thereto by normal road movement between the sprung and the unsprung mass of the vehicle.

More particularly, each of the flutes 100 include an inwardly located formed ridge or rib 102 which has a bent end defining a flat end surface 104 adjacent a tapered opening 106 which is filled by a plug of sealing material 108.

Each of the ribs or ridges 102 merges into the undeformed side wall of the tube 38 along a peripheral circumference 110 at a predetermined point along the height of tube 38.

Additionally, each of the flutes 100 includes an outwardly formed ridge or rib surface 112 that is joined at each side thereof by a surface 114, 115 to an adjacent one of the inwardly formed ribs or ridges 102.

The inwardly directed ribs 112 each include an internal surface 116 formed thereon which supportingly receives a continuous circumferential, inclined surface 118 on the bottom of the base valve 24 for locating it and the end of the pressure cylinder 22 axially within the shock absorber 20.

Furthermore, the support surface 116 is joined to the flat surface 104 through a curved inner surface 120 which serves as a transition between the flat end surface 104 and the base valve supporting surface 116. The outwardly formed surfaces 112 define flow passageways 121 as shown in FIG. 13 for the flow of hydraulic fluid into and out of reservoir 36 during shock operation.

In the illustrated arrangement the outer surface 121 of the bottom bearing ring 98 is slightly depressed into the end of the outer ridges 112 around the opening 106 therein to be fused in bridging relationship across adjacent ones of the ridges and to plug 108 for fixedly and rigidly securing the bearing ring 98 on the end of the rib reinforced closure on the reservoir tube 48.

With reference to FIGS. 7 and 8 a single female die is illustrated that is used in practicing the process of the present invention.

More particularly, it is the means by which the aforedescribed flute structure is obtained in closing the integral cup end of the reservoir tube 38.

The die 122 includes a concave inner surface 124 which has a central opening 126 therethrough.

The concave surface 124 is formed in a generally conoidal configuration above the opening 126. More particularly, it includes a plurality of radially outwardly directed grooves 128 with a maximum depth adjacent the opening 126 and a minimum depth at a point where they merge with the upper periphery 130 of the surface 124.

Each of he grooves 128 is slightly tapered at the point that it intersects an adjacent groove as at 132 in FIG. 7.

The tapered section is defined on the opposite sides thereof by transition edges 134 formed on the surface 124 and curved as shown in FIG. 8 to define a relatively sharp lead edge from opening 126 to a raised surface or ridge 136 between each of the adjacent grooves 128.

As viewed in FIG. 7 each of the ridge surfaces 136 has a triangular configuration with an apex at the upper end of each of the edges 134. They also include a base portion which merges into the generally cylindrical upper inner surface edge 130 of the concave surface 124.

The die 122 constitutes a single processing tool that simultaneously forms the reinforcing flutes 100 and the opening 106 as well as a configuration of folded metal on the tube 38 to be described from which material is heated to flow into the tapered opening 106 to eventually define the weld plug 108.

A further aspect of the present invention is an intermediate process step wherein the diameter of the tapered opening 106 is closed controlled while the base valve supporting surfaces 116 are defined in the inwardly directed ribs 102.

Referring now to FIG. 9, a coin punch 140 is illustrated that includes an end surface 142 thereon including a truncated transition surface 144 that connects a large diameter upper portion 146 of the punch to a smaller diameter portion 148.

The end of the smaller diameter portion 148 has a flat end portion 150 which is joined to a curved segment 152 that defines a transition between the flat end surface 150 and the outer periphery of the small diameter portion 148.

As seen in FIG. 9, the punch includes a top head 154 which is acted upon by a hydraulic press to move the end of the coining punch into engagement with the end of formed tube for simultaneously configuring the inner surface thereof in accordance with he shape of the end 142.

To assemble a shock absorber reservoir tube in accordance with the invention first a reservoir tube is formed in a tube mill. It is made from a thin gauge material having a thickness in the order of 0.038–0.046 inches.

Figure 2:
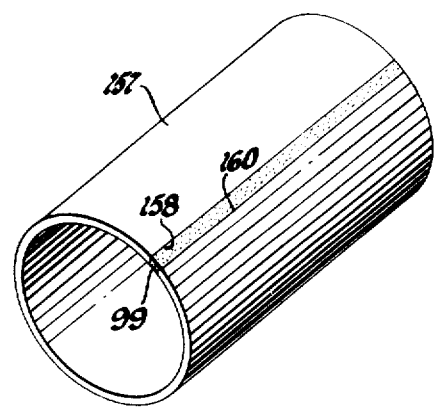
FIG. 2 is a vertical sectional view of a tube formed from the blank and seam welded along the longitudinal edges thereof.

Strip steel of this thickness having a predetermined width is rolled on itself as shown in FIG. 2 to have a maximum oval shape not to exceed 0.008 inches as rolled.

The strip has longitudinal edges 158, 160 thereon that are located in close proximity to one another following rolling and thereafter these edges are joined together by a seam weld 99 as the strip of material passes through the tube mill.

In the mill the I. D. weld bead is rolled to give a smooth surface along the weld and a maximum height through the weld not to exceed 0.010 inches.

Figure 3:
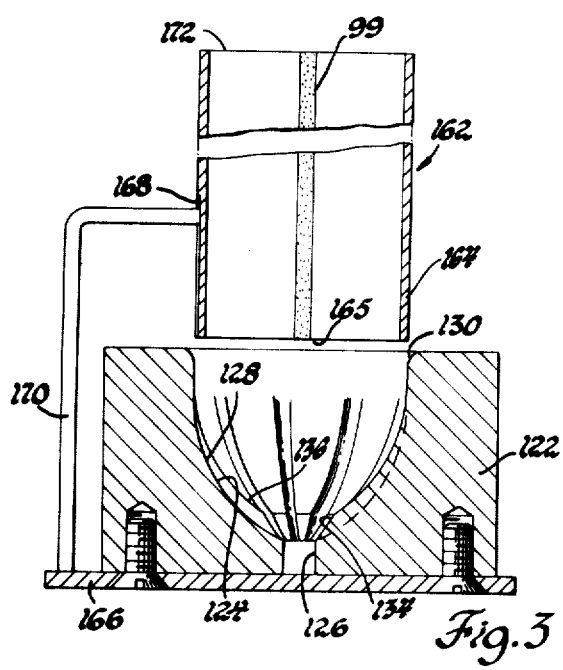
FIG. 3 is a vertical sectional view of the tube of FIG. 2 being aligned with a die.

This rolled and welded member 162 assumes an elongated tubular shape which has its end 164 fed into a single female die station shown in FIG. 3 wherein a die 122 corresponding to that shown in FIGS. 7 and 8 is supported on a work platform 166 in alignment therewith.

At this station the longitudinal weld seam 99 is located in axial alignment with the die by indexing means, for example a small depth groove 168 formed in the outer surface of the tubular member 162 as it is rolled and an indexing arm 170 upstanding from the work platform 156.

More particularly, the indexing of the arm 170 and the groove 168 locates the longitudinal seam weld 99 in overlying relationship with the portion of the concave surface 124 which gives the greatest support to the tubular member or process tube 162 during a metal forming operation to be discussed.

Thus, as illustrated in FIG. 3, the seam weld is in alignment with the transition edge 134 leading into the upper surface 136 which will support the longitudinal weld 99 as the tube 162 is being acted upon by the single female die 122.

In accordance with certain principles of the present invention a hydraulic press acts on the upper end 172 of the process tube 162 to force it into the concave surface 124.

This action causes the end of the tube 162 to be folded and deformed across the inside surface of the die 122.

More particularly, the end 165 has its metal folded radially inwardly and forced into each of the grooves 128 of the concave surface 124 to form each one of the circumferentially spaced inwardly directed ridges 102 from the peripheral inner surface 130 of the die to the opening 126 therethrough.

Simultaneously, the metal is deformed to flow over each of the surfaces 136 to form a plurality of the outwardly directed ridges or surfaces 112 and the surfaces 114, 116 on either side of the raised die surfaces 136.

At the same time the metal at the end 165 of the process tube 162 is folded in an accordion fashion around the opening 106 to form a plurality of folds 174 around a small diameter opening in the end 165 as best seen in FIG. 14.

The folds 174 have a plurality of sharp radius transitions 176 on the outer surface of the tube end 165 completely around the opening 106 therethrough.

The folds 174 represent a high density concentration of material which will substantially fill the volume of the opening 106 during a subsequent final closure step in the method.

The deformation of the tube 162 into the die as shown in FIG. 3, also produces a controlled foreshortening of the member until it corresponds to the length of the reservoir tube 38 in the final shock absorber assembly.

Figure 4:
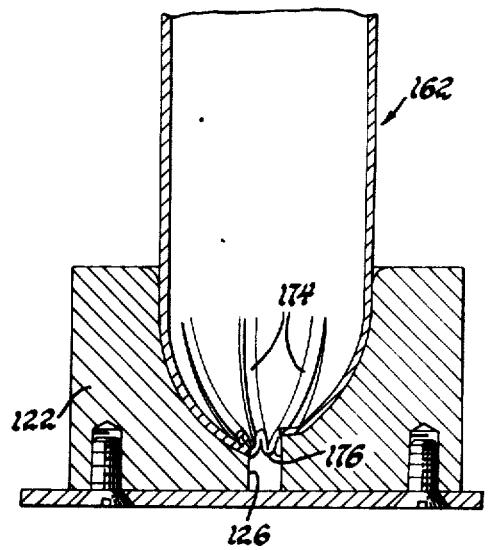
FIG. 4 is a vertical sectional view of the tube deformed into the die to form an integral end cup on the tube.
Figure 5:
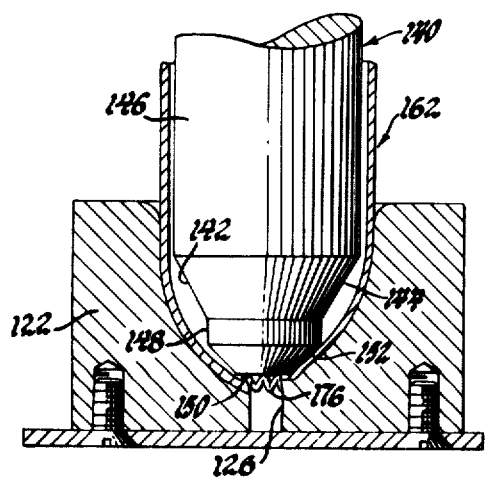
FIG. 5 is a vertical sectional view of the parts after a coining operation.
Figures 22, 23, 24:
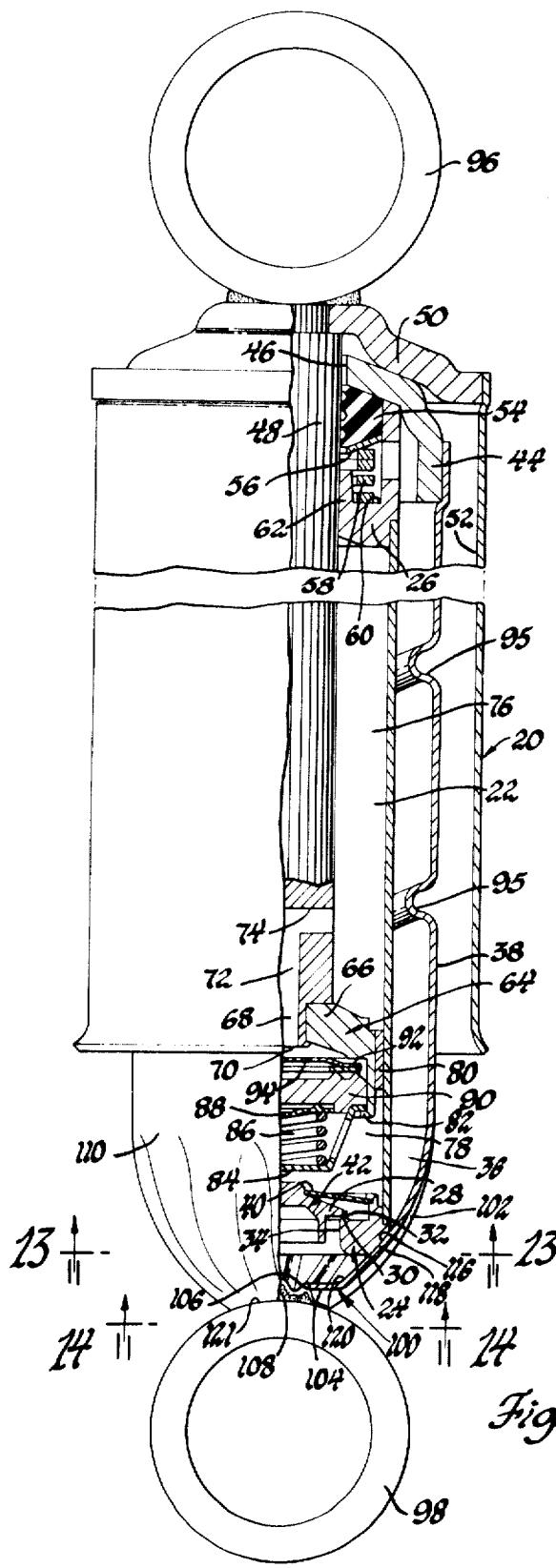

When the tube has been foreshortened a predetermined distance and deformed into the single female die 122 to result in a structure having the plurality of equidistantly circumferentially spaced flutes 100 and the high density folded material 174 around an end opening 106, the process tube 162 is located at a station shown in FIG. 4, where the coin punch 140 is positioned coaxially of the process tube 162 so as to locate the flat surface 150 against the flat end surfaces 104 on the inward ridges or ribs 102.

This can be done when the formed tube 162 is still in the die 122.

The punch is operated by a hydraulic press to press the inward ridges or ribs into a configuration identical to that of the end 142 thereby to simultaneously coin the formed tube around the opening 106 to control its maximum diameter and to produce a generally tapered opening through the end of the process tube 162 at the juncture of each of the ribs and still further form the metal in that vicinity to a more dense configuration.

Simultaneously, the end 142 will form the inwardly directed ribs to the configuration of the surface 152 to define the base valve assembly support surfaces 116.

From the coining operation the process includes a welding step wherein a connector element is secured to the process tube in overlying relationship to the tapered opening 106 therethrough.

In order to avoid leaks the connector is preferably seamless. While shown as a ring element, other connector elements are contemplated for use in practicing the invention such as stud connector or other means suitable for securing the shock absorber 20 in operative position between the sprung and unsprung mass of a vehicle.

As shown in FIG. 6, the process tube 162 is supported in a hollow arbor 180. It includes an upstanding electrode 182 therein which has an end 184 thereon configured identically to the end 142 on the coin punch.

This rests on the inner surface of the end of the process tube 162 in the same location as did the coin punch following the coining operation.

It is connected by a conductor 186 to one side of weld apparatus 188 that is connected by a conductor 190 to an electrode 192 in a welding press.

The electrode 192 and electrode 182 are moved together by a hydraulic press within the apparatus to apply a predetermined pressure in the order of 3,000 pounds between the ring and the outer surface of the process tube 162.

Simultaneously, a preselected welding current is applied across the electrodes 182, 192 causing the high-density metal in the regions of the folds 174 to flow into the controlled diameter opening 106 to form the seal plug 108 within the opening 106.

Simultaneously, the ring sinks into the folded metals as illustrated in FIG. 11 to produce a strong mechanical joint between the ring and the processed tube at this point. The position and form of the parts prior to welding are shown in FIG. 12.

In one working arrangement the processed tube was of a low-carbon steel capable of being welded in a DC resistance welding tube mill.

The steel includes the following properties:

| | Chemical | |
|---|---|---|
| Carbon | | 0.05–0.10% |
| Manganese | | 0.30–0.60% |

| | |
|---|---|
| Sulphur | 0.05% maximum |
| Phosphorus | 0.04% maximum |
| Mechanical | |
| Tensile strength, transverse | 46,000–51,000 p.s.i. |
| Yield strength, transverse | 33,000–38,000 p.s.i. |
| Hardness $R_{30T}$ | 44–55.5 |
| Hardness $R_B$ | 42–57 |

Preferred examples of welding schedules suitable for causing the high concentration of folded material to completely flow into a sealed plug relationship within the opening 106 and to allow for a control sink of the ring into the formed end of the process tube 162 are set forth below. The settings represent those for a standard 150 KVA welder with a 175–400 primary amp. rating.

The welders are set for a predetermined number of current cycles at a predetermined heat setting.

EXAMPLE 1

Welder set at 100 percent heat; ring squeezed for 74 cycles followed by 50 weld cycles; 45 hold cycles and 2 off cycles. In this example the primary current is 400 amps. It is desirable that the upslope of the current cycle be used; for example start upslope at 40 percent heat and reach 100 percent heat in 9 cycles and continue 100 percent heat for remaining weld cycles. This prevents flash. This causes the ring to sink into the fold metal to gain maximum fatigue strength at the structural joint between the bearing ring and the process tube.

EXAMPLE 2

7 weld cycles at 85 percent heat followed by 40 cycles at 75 percent heat.

EXAMPLE 3

15 weld cycles at 50 percent heat followed by 25 cycles at 80 percent heat.

These welding schedules are merely representative, it being understood that changes in squeeze, weld, hold and off cycles will be required to weld different shaped connectors to the formed tube and to weld different materials. The important considerations are to get a good seal plug in the tube and a seated, welded relationship between connector and tube to assure a good strong joint suitable for stress levels present in automotive shock absorber environments.

In evaluating the resultant structural connection between the bearing ring and the process tube the unit is subjected to fatigue tests wherein it is loaded perpendicular to the centerline of the ring and subjected to a cyclic moment at the opposite end of the shock absorber of 500 inch pounds at 1,625 plus or minus 25 cycles per minute.

The unit was then cycled to failure.

With units welded as set forth in the examples above the fluted tubes averaged from 25,000 to 50,000 cycles before failure.

This compared with standard production shock absorbers wherein a bearing ring is connected directly to a separate base cup element by weld material which failed following between 12,000 and 15,000 cycles.

Additionally, it was noted that in a tensile test wherein the opposite ends or bearing rings 96, 98 of the unit were connected to a tensile machine that the tensile strength of the welded connection between the ring and the fluted end of the process tube were in the order of 9,000 to 10,000 pounds and that in many cases the piston was pulled from the piston rod before the welded connection between the fluted tube and the bottom bearing ring occurred.

From the above data it is clear that in addition to simplifying the manufacture of shock absorber reservoir tubes that the improved method set forth above gives an unusually high strength connection superior to those found in standard production shock absorbers.

While the embodiments of the present invention, as herein disclosed, constitute a preferred form, it is to be understood that other forms might be adopted.

I claim:

1. A method for forming a shock absorber tube having an integral end cup thereon comprising the steps of forming a thin wall metal tube having open ends thereon, forming a concave die surface having a central opening therein and a plurality of grooves extending radially and upwardly of said central opening, forcing one end of the tube into the die to simultaneously reduce the diameter of the tube while folding it over the die surface into the grooves and over ribs between the grooves and to crimp the end of the tube into a predetermined small diameter high metal density portion with a tapered opening therethrough and sharp edges therearound, coining the end of the tube formed by the die in the vicinity of the tapered opening therethrough to produce a controlled maximum diameter in the opening, locating a connector element in overlying relationship with the opening at the outer surface of the formed tube in contact with the coined end surrounding the opening, applying pressure and welding current across the junction between the formed tube and the connector element to cause the high-density material around the opening to melt and deform into the tapered opening into the tube, maintaining the pressure to cause the connector to sink into the high-density material for connection thereto and to force it into the opening to completely fill the opening with a plug of melted metal for sealing the formed end of the tube, thereafter removing the heat and pressure and cooling the tube to produce a strong connection between the connector and the tube at the sealed opening.

2. A method for forming a shock absorber tube having an integral cup on one end thereof comprising the steps of; forming a sheet metal tube having a longitudinal seam weld along the length thereof, forming a concave die surface having a central opening therethrough with a plurality of grooves extending from the opening to the top edge of the concave surface separated by raised ribs, circumferentially locating the seam weld along the length of the tube in alignment with a rib on the die between two of the grooves, pressing the tube into the die to form the end of the tube to a smaller diameter by folding metal on the forced end of the tube into the grooves and over the ribs between the grooves to form a plurality of spaced inwardly directed ribs within the tube joined to a plurality of outwardly directed ribs thereon, maintaining the longitudinal seam weld on the outer surface of one of the ribs during the forming process to control the amount of metal stretch in the vicinity of the seam weld minimize the probability of leak holes being formed during folding of the metal within the die, forming a high-density crimped annular segment in the folded metal at the die opening to form a tapered opening in the formed end of the tube, coining the formed tube at the tapered opening therethrough to produce a controlled diameter opening into the interior of the tube, locating a connector element on the outer surface of the tube to cover the tapered opening on the outer end surface thereof, simultaneously pressing the connector element against the end surface of the tube and applying welding current thereto for causing the high density material around the opening in the formed end of the tube to flow into the controlled diameter of the opening for filling it with weld metal while securely fastening the connector to the end of the formed tube.

3. A method for manufacturing a shock absorber cylinder having an integral end cup comprising the steps of: forming a blank sheet metal material, rolling said blank into a tubular member, locating adjacent edges of said tubular member in longitudinal alignment with one another, welding said edges together along the length of said tubular member to produce a sealed longitudinal joint along the length of said tubular member, forming a concave die surface having a central opening therethrough and a plurality of radially extending equally spaced grooves extending from said opening to the upper periphery of the die surface, locating one end of said tubular member against the die surface and forcing the one end into the die surface to cause the sheet metal material to be die formed over ridges formed between each of the grooves of the die so as to form a plurality of ribs directed inwardly of the tubular member, also forming the one end into the grooves of the die to form a plurality of ribs directed outwardly of the tubular member, said ridges and grooves along with the die opening forming a tapered opening through the drawn end of the tubular member and a continuously crimped high-density metal area around the opening through said die having a plurality of sharp edges thereon at the smallest diameter portion of the drawn metal, coining the drawn end of the tube to flatten the high-density material around the opening therein to produce a predetermined maximum diameter at the tapered opening, locating a continuously formed connector element on the outer surface of the formed end in overlying relationship with the coined end of the high density material to close the tapered opening, connecting a first electrode at the controlled diameter of the tapered opening within the interior of the tubular member, connecting a second electrode to the connector element, applying pressure between the connector member and the formed shell and applying welding current across the electrodes to cause the high density material around the tapered opening to become plastic and flow inwardly of the tubular member into the tapered opening, maintaining the pressure to cause the connector element to force the heated plastic material into the tapered opening to fill it so as to completely seal the opening at the controlled diameter portion thereof, and simultaneously forcing the connector element into the end of the tubular member to cause the connector element to bridge between the spaced outwardly directed ribs and be connected thereto by the melted plastic material to securely attach the connector element in place on the end of the tubular member.

4. A method for manufacturing a shock absorber cylinder having an integral end cup comprising the steps of: forming a blank of sheet metal material having a thickness less than approximately 0.050 inches, rolling said blank into a tubular member having a maximum oval shape of less than 0.008 inches, locating adjacent edges of said tubular member in longitudinal alignment with one another, welding said edges together along the length of said tubular member to produce a sealed longitudinal joint along the length of said tubular member, forming a concave die surface having a central opening therethrough and a plurality of radially extending equally spaced grooves extending from said opening to the upper periphery of the die surface, locating one end of said tubular member against the die surface and forcing the one end into the die surface to cause the sheet metal material to be die formed over ridges formed between each of the grooves of the die so as to form a plurality of ribs directed inwardly of the tubular member, also forming the one end into the grooves of the die to form a plurality of ribs directed outwardly of the tubular member, said die ridges and grooves along with the die opening forming a tapered opening through the drawn end of the tubular member and a continuously crimped high-density metal area round the opening through said die having a plurality of sharp edges thereon at the smallest diameter portion of the drawn metal, coining the drawn end of the tube to flatten the high density material around the opening therein to produce a predetermined maximum diameter at the tapered opening, locating a continuously formed connector element on the outer surface of the formed end in overlying relationship with the coined end of the high-density material to close the tapered opening, connecting a first electrode at the controlled diameter of the tapered opening within the interior of the tubular member, connecting a second electrode to the connector element, applying approximately 3,000 pounds of pressure between the connector member and the formed tubular member and applying welding current in the range of 200–400 primary amps for a first controlled number of cycles followed by a second controlled number of cycles to cause the high-density material around the tapered opening to become plastic and flow inwardly of the tubular member into the tapered opening, maintaining the pressure to cause the connector element to force the heated plastic material into the tapered opening to fill it so as to completely seal the opening at the controlled diameter portion thereof, and simultaneously forcing the connector element into the end of the tubular member to cause the connector element to bridge between the spaced outwardly directed ribs and be connected thereto by the melted plastic material to securely attach the connector element in place on the end of the tubular member.

* * * * *